Dec. 28, 1926.

O. L. MARSHALL 1,611,931

DETACHABLE CRANKING DEVICE

Filed May 29, 1926     2 Sheets-Sheet 1

Inventor:
Oscar Lee Marshall

Dec. 28, 1926.

O. L. MARSHALL 1,611,931

DETACHABLE CRANKING DEVICE

Filed May 29, 1926    2 Sheets-Sheet 2

Inventor.
Oscar Lee Marshall

Patented Dec. 28, 1926.

1,611,931

UNITED STATES PATENT OFFICE.

OSCAR LEE MARSHALL, OF CALIFORNIA, MISSOURI.

DETACHABLE CRANKING DEVICE.

Application filed May 29, 1926. Serial No. 112,602.

The title of the invention is detachable cranking device.

The general nature of the invention is a lower fan pulley to be attached on the end of the crank shaft in Ford motors to which is fastened a ratchet housing containing a loose crank ratchet, the outer end of the crank ratchet containing a square hole for the insertion of the crank.

The object of the invention is to provide a device for use as a detachable crank for use on Ford motors.

A description of the accompanying drawings is as follows:—

Figure 5:
Figure 5 shows coil spring which disengages the crank ratchet, when the crank is removed.
Figure 7:
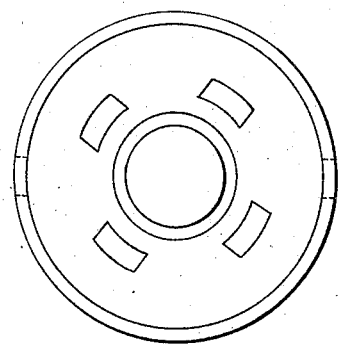
Figure 7 is an end view of the lower fan pulley from the outer end.
Figure 8:
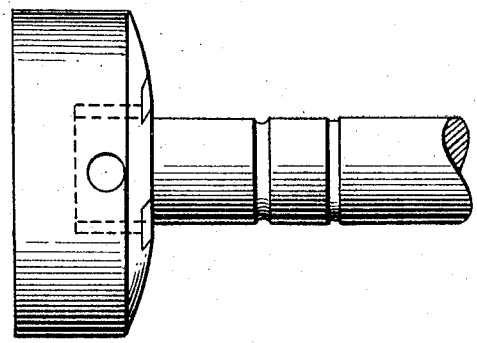
Figure 8 is a side view of the lower fan pulley on the crank shaft.

A description of this device and its operation follows:

The lower fan pulley shown as top view in Figure 5 contains four slots as shown in said drawing.

Figure 1:
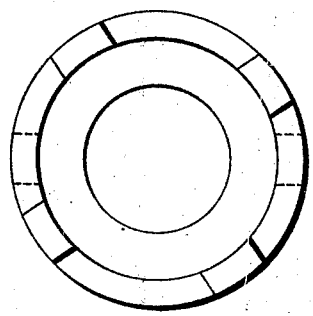
Figure 1 shows an end view of the ratchet housing and Figure 2 shows a side view of the ratchet housing.
Figure 2:
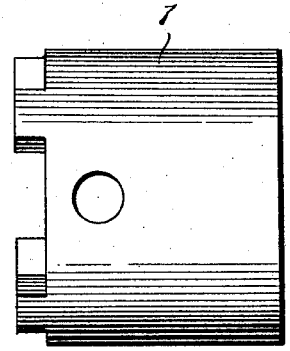
Figure 3:
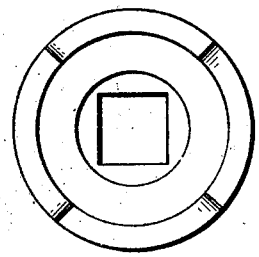
Figure 3 shows a view of the crank ratchet from the inner end and Figure 4 shows a side view of the crank ratchet.
Figure 4:
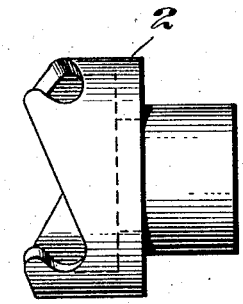

The ratchet housing has four lugs on inner end as shown by right hand view in Figure 1, which lugs pass through said slots in the lower fan pulley, the end of said lugs to be bradded to attach ratchet housing to lower fan pulley. The inner end of the housing is open and the outer end has a hole sufficiently large for the outer end or stem of the ratchet to pass through and turn in.

The crank ratchet has four prongs on the inner end to engage the cranking pin for cranking.

The crank ratchet goes into the ratchet housing from the inner end, and the outer end or stem of the ratchet, which contains a square hole for the insertion of the crank, passes through the hole in the outer end of the ratchet housing. The outer end or stem of the ratchet, which contains the square hole for the insertion of the crank, is smaller in diameter than the part of the ratchet which contains the prongs, and the hole in the outer end of the ratchet housing being only large enough for the outer end or stem of the ratchet to pass through and turn in, the ratchet cannot come out of the outer end of the housing. The ratchet is loose in the housing and has sufficient play backward and forward to engage the crank pin, when the crank is pushed in, and to come forward and be disengaged, when the crank is out. The ratchet is disengaged by the coil spring shown in Figure 5 the end of which fits into a chamber inside of the ratchet.

Figure 12:
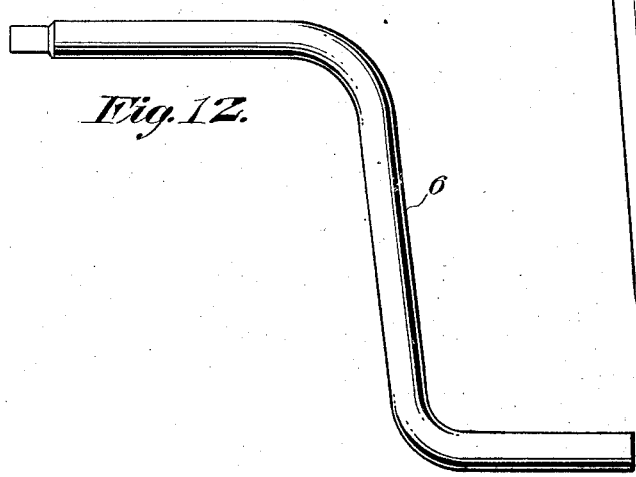
Figure 12 shows the crank which works in this device.

The crank has a square end, as shown in Figure 12, to fit into the outer end or stem of the crank ratchet.

Figure 6:
Figure 6 shows the crank pin which passes through the lower fan pulley, ratchet housing and crank shaft to fasten same together and to engage crank ratchet and serve as cranking pin.

The device is installed by simply removing the old fan pulley from Ford motor and placing this device on the end of the crank shaft so that the crank pin shown in Figure 6 will pass through the lower fan pulley, the ratchet housing, and the crank shaft and fasten same together and fasten the device on to the crank shaft. The hole in one side of the lower fan pulley being smaller than the hole on the other side through which the crank pin is inserted, so that when the crank pin is inserted and driven through and into said smaller hole it cannot go on through, and so that it binds, and said crank pin has a small hole through it near the outer end, which will be just inside the housing at the large hole in the housing through which the pin is inserted, through which hole in the pin a cotter pin is to be placed so that the crank pin cannot come out back through the large hole.

Then when the crank is inserted, it pushes the ratchet back so as to engage the ratchet prongs with said crank pin to turn the crank shaft and when the crank is removed the coil spring disengages the ratchet from the cranking pin.

Figure 9:
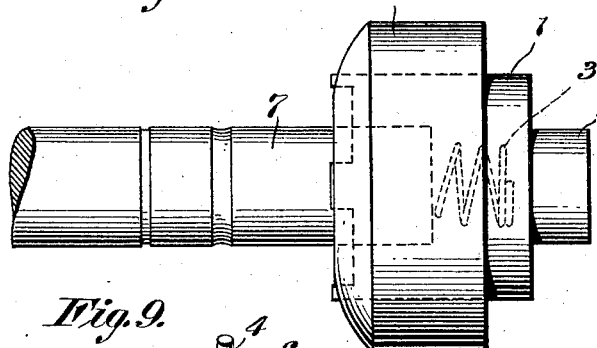
Fig. 9 shows a view of the device with the crank out.
Figure 10:
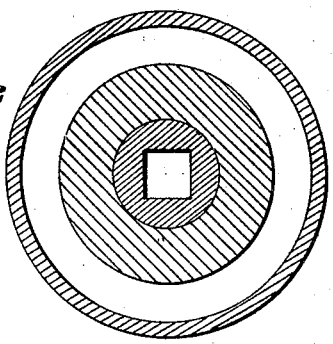
Fig. 10 is a cross section of Fig. 9.
Figure 11:
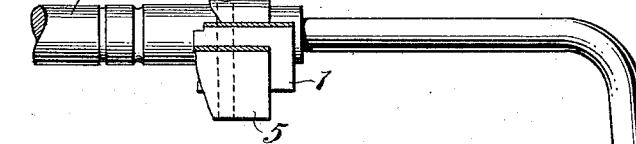
Fig. 11 shows the device assembled ready to crank.

Figure 11 in the accompanying drawings shows the device ready to crank, part of same being a cross section view. In Figure 11, 6 is the crank, 1 is the ratchet housing (cross section), 5 is the lower fan pulley (cross section), 4 is the cranking pin, and 2 is the ratchet pushed forward by crank with the prongs engaging the cranking pin, and 7 is the crank shaft. The coil spring does not show in Figure 11. Figure 9 shows a cross section view of the device with crank out, with all parts referred to by same numbers as in Figure 11, but Figure 9 shows 3 which is the coil spring and does not show the cranking pin. Figure 10 is an end view of the device from the outer end, with crank out.

I claim:—

A one piece, flat faced, crown pressed fan pulley, open at outer end, with web at inner end containing a hub for reception of crank shaft, said web also containing four slots evenly spaced for reception of lugs of crank ratchet housing, the face of the pulley containing two holes diametrically opposite for cranking pin to pass through, one of said holes being slightly smaller than the other so that end of cranking pin will bind in same, the hub of said pulley also containing two holes in line with said holes in face of fan pulley for cranking pin to pass through; a cup shaped ratchet housing with four lugs evenly spaced on inner end to pass through the slots in the web of fan pulley and be bradded, said housing having a round hole in outer end for reception of ratchet stem, and also having two round holes diametrically opposite in walls of housing for cranking pin to pass through; a four prong ratchet, fitting into said housing, with hollow at inner end for reception of hub of fan pulley, when in cranking position, said ratchet having a cup in bottom of said hollow to house coil spring, the prongs of said ratchet being evenly spaced around rim of ratchet at inner end, said ratchet having a stem at outer end to pass through hole in outer end of ratchet housing, said stem containing a square hole for reception of crank, said ratchet having sufficient play backward and forward in said ratchet housing to engage the prongs of the ratchet with the cranking pin, when in cranking position, and to be disengaged from the cranking pin by the coil spring, when not in cranking position; a coil spring in the cup at the bottom of hollow of ratchet; a cranking pin which passes through holes in face of fan pulley and in walls of ratchet housing and hub of fan pulley to bind same together and to be engaged by ratchet prongs when ratchet is pushed in; a crank with squared end to fit in hole in end of crank ratchet stem.

OSCAR LEE MARSHALL.